United States Patent [19]
Ginn et al.

[11] 3,806,027
[45] Apr. 23, 1974

[54] MULTI PORT FLOW CONTROLLER

[75] Inventors: Leroy Dry Ginn; Leroyce Sloe Ginn, both of Oakland, Calif.

[73] Assignee: Universal Pneumatic Controls Inc., Oakland, Calif.

[22] Filed: June 5, 1973

[21] Appl. No.: 367,140

[52] U.S. Cl............................ 236/49, 236/80, 137/84
[51] Int. Cl............................................. F24f 11/02
[58] Field of Search .................... 137/84; 236/80, 49

[56] References Cited
UNITED STATES PATENTS
3,719,321   5/1971   McNabney............................ 236/49
2,961,163  11/1960   Jensen ............................. 236/80 X Primary Examiner—William E. Wayner
Attorney, Agent, or Firm—Owen, Wickersham & Erickson

[57] ABSTRACT

A controller for a volume regulator box in an air distribution system makes secondary use of control air. Secondary bleed nozzles are used in a way that eliminates the need for high pass and low pass control relays, mechanical interlock between such control relays and high control pressures.

The controller is of modular construction with each module performing a separate control function. A single controller design can be adapted to different uses, such as a maximum velocity control in a high static pressure application or a maximum and minimum velocity control in a low pressure application.

43 Claims, 22 Drawing Figures

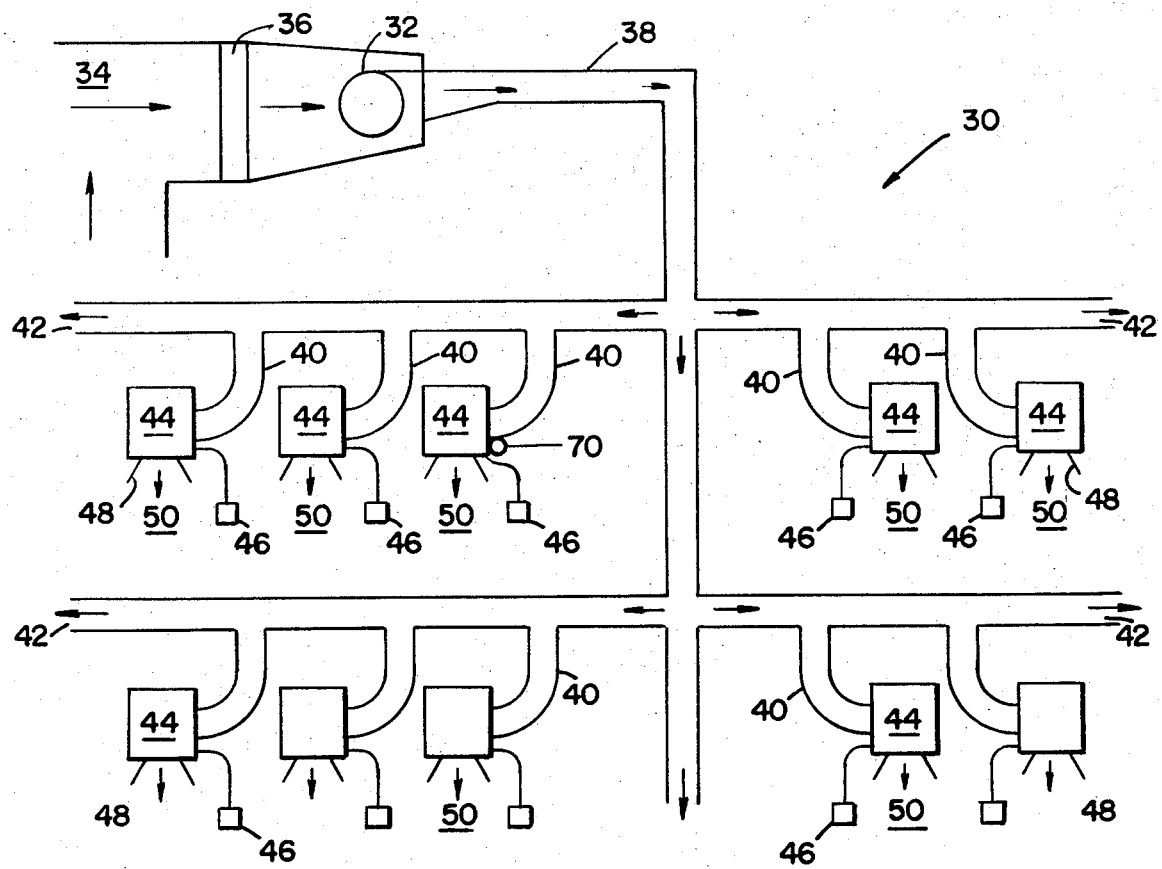
FIG_1
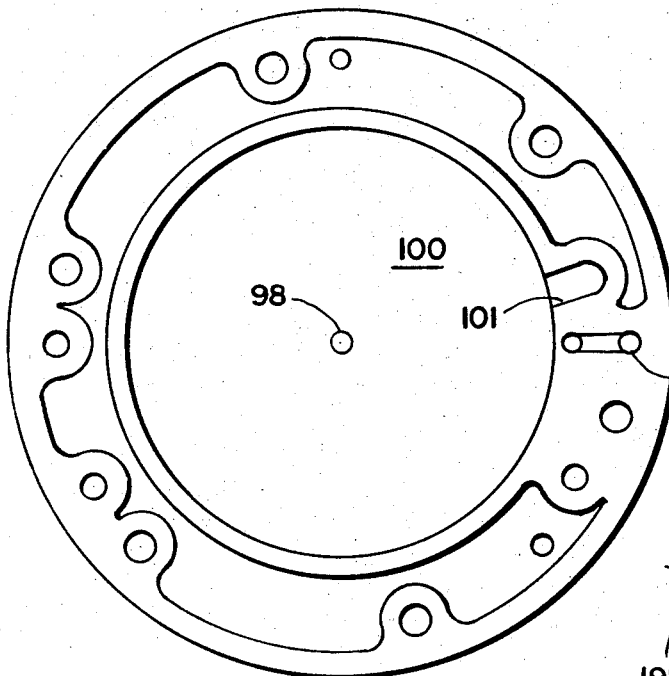
FIG_14
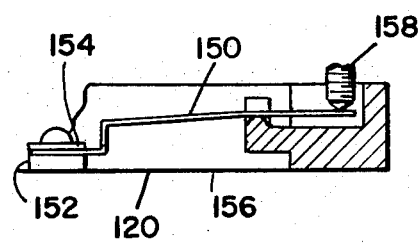
FIG_15
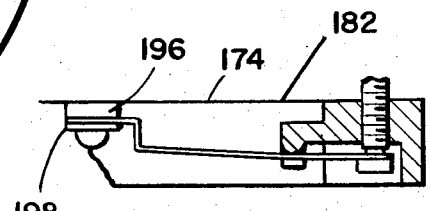
FIG_16

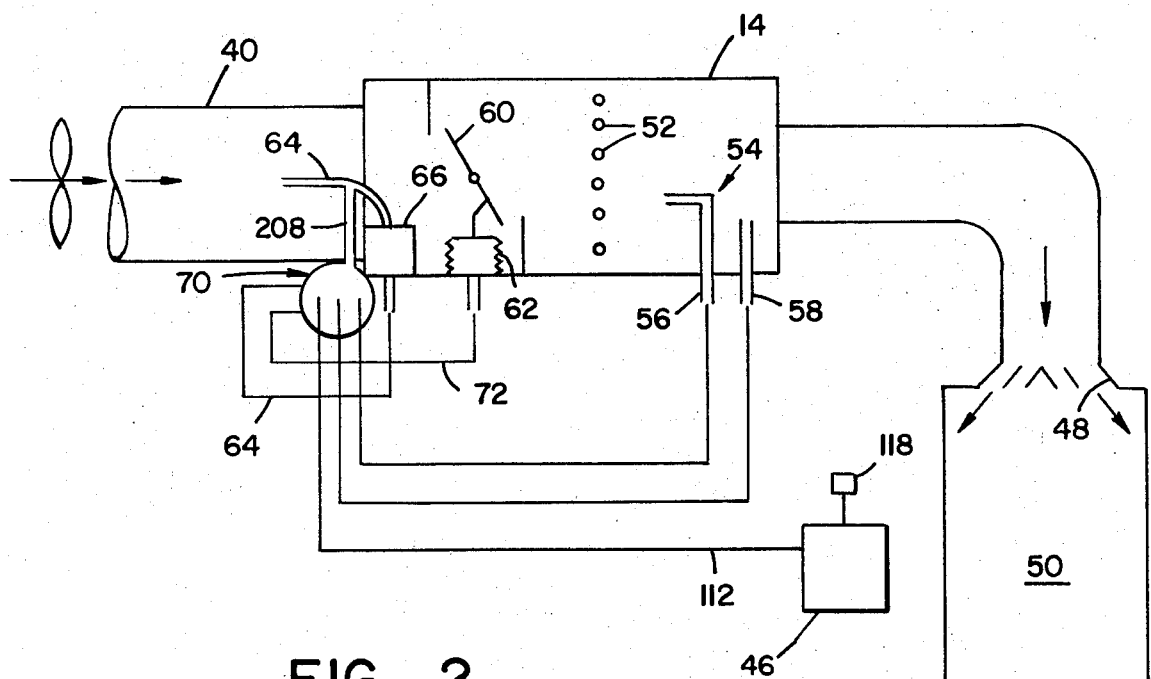
FIG_2
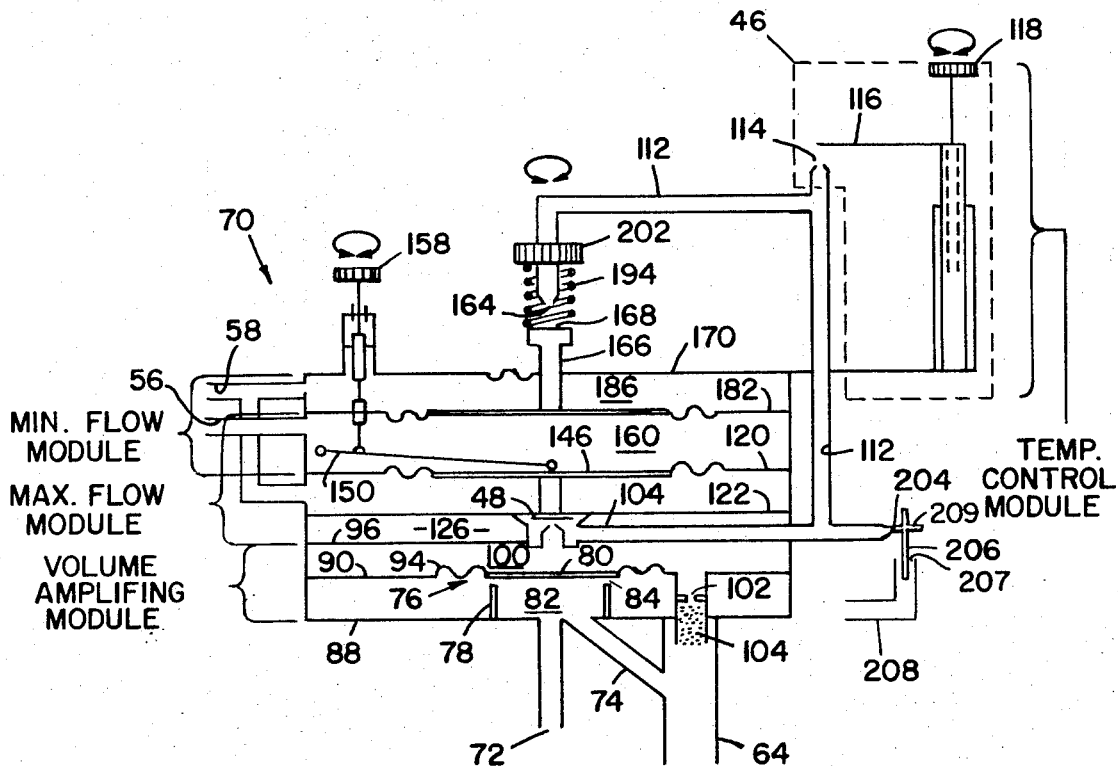
FIG_3

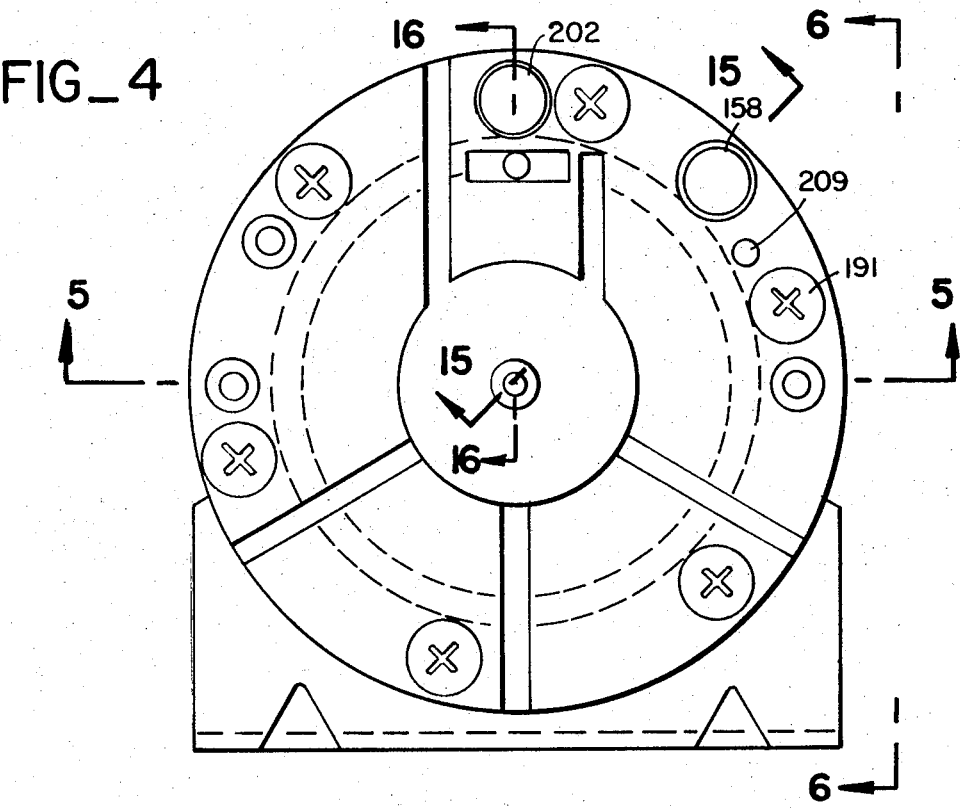
FIG_4
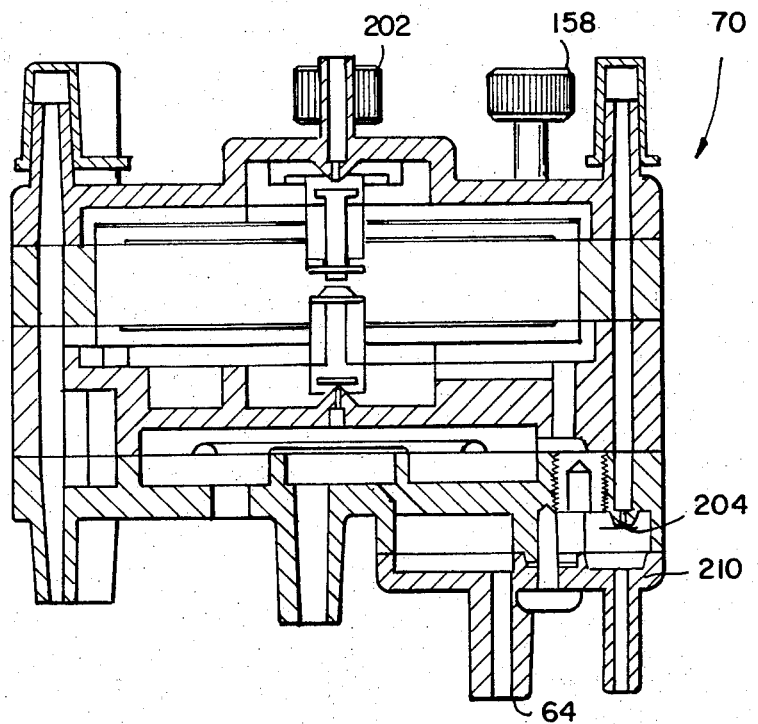
FIG_5

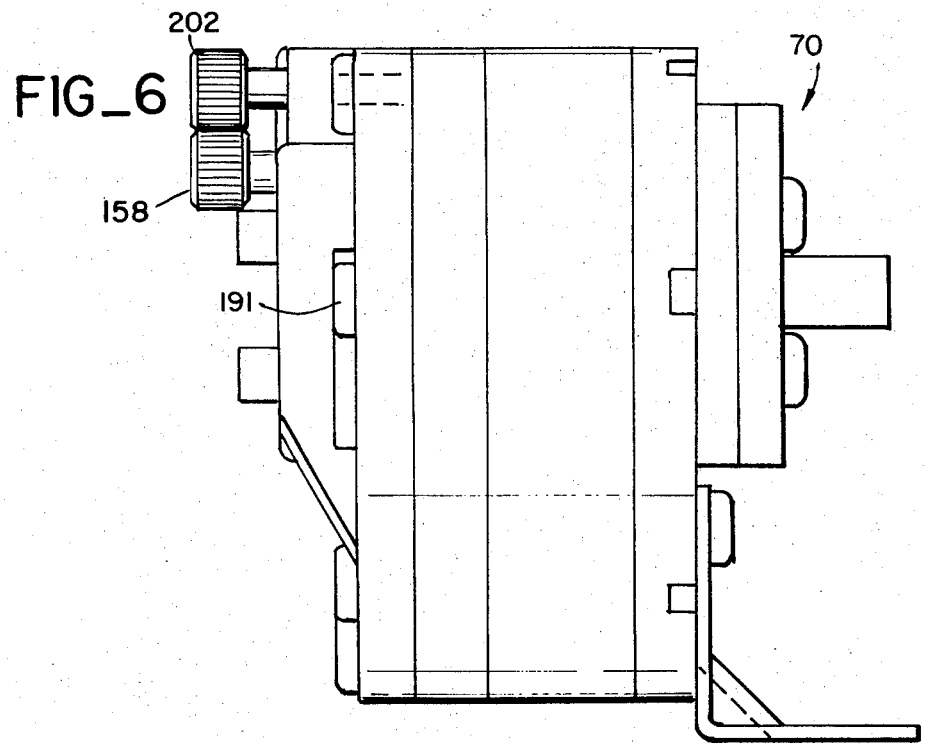
FIG_6
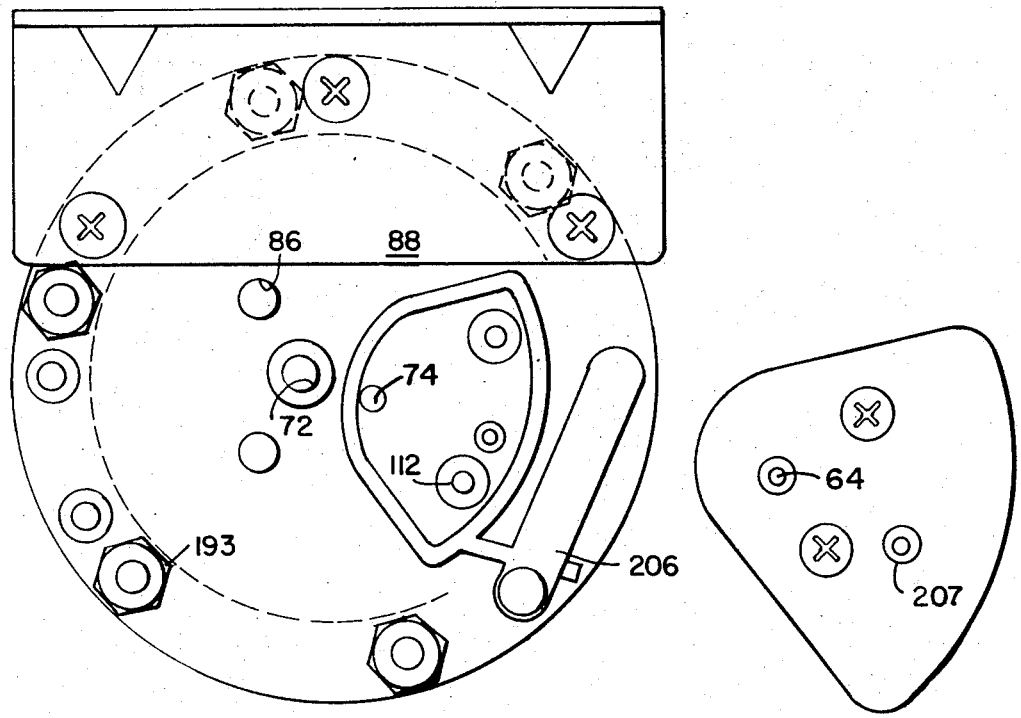
FIG_7

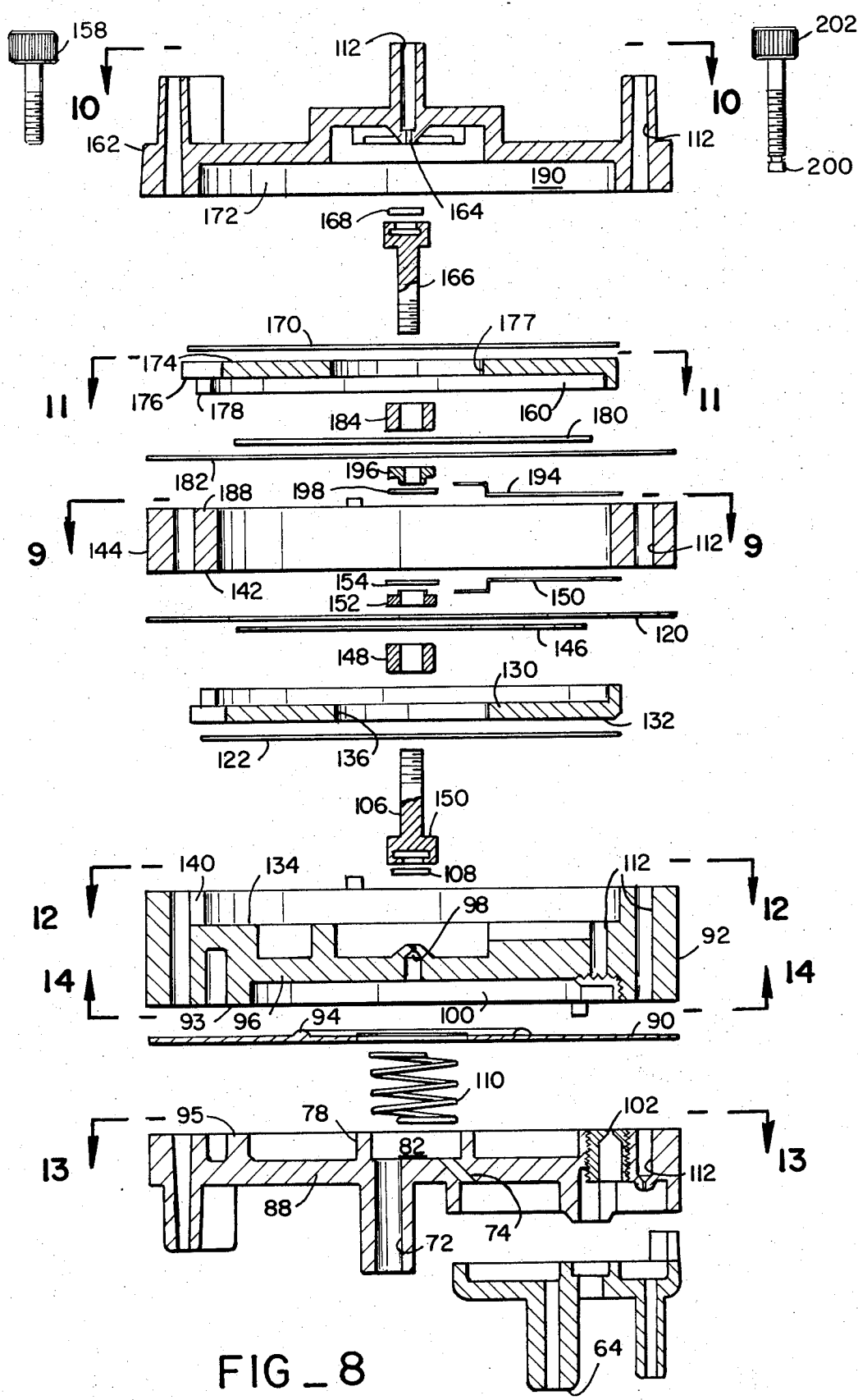
FIG_8

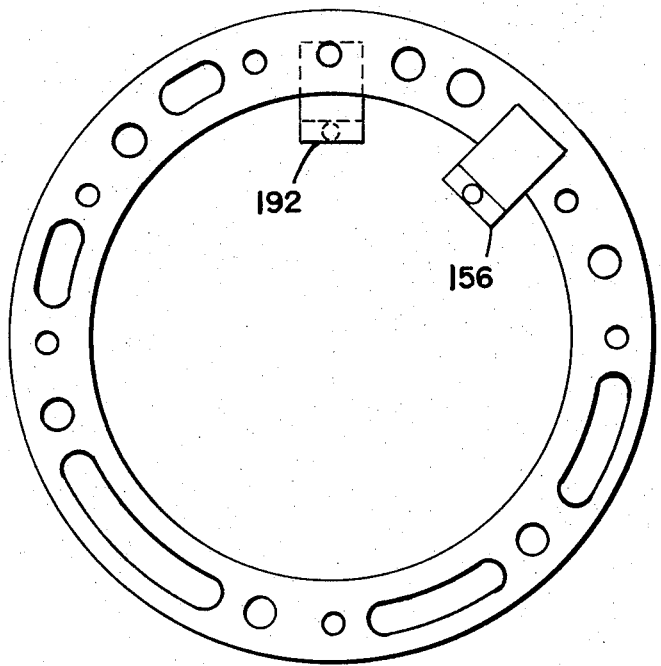
FIG_9
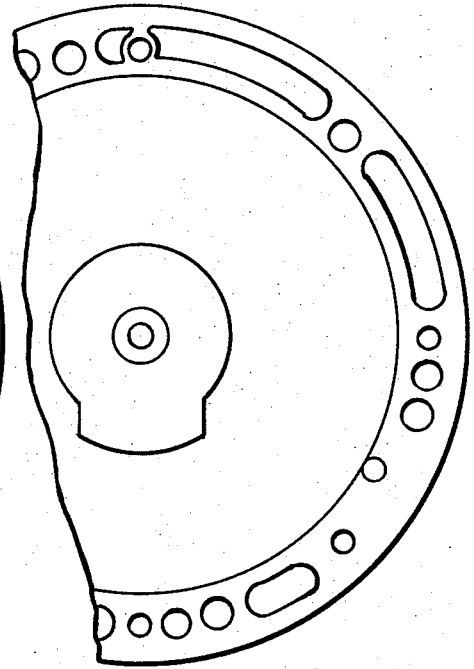
FIG_10
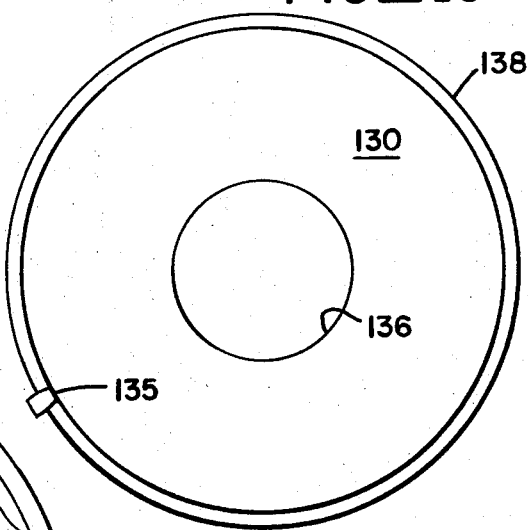
FIG_11
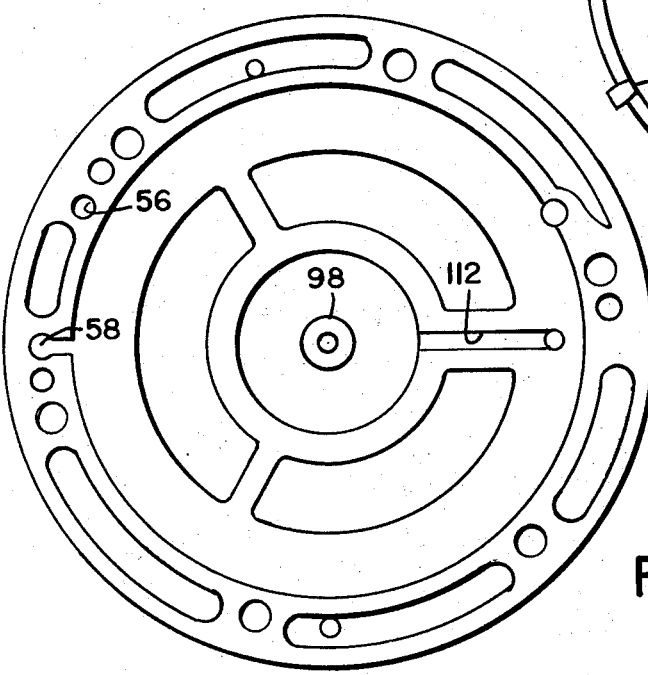
FIG_12

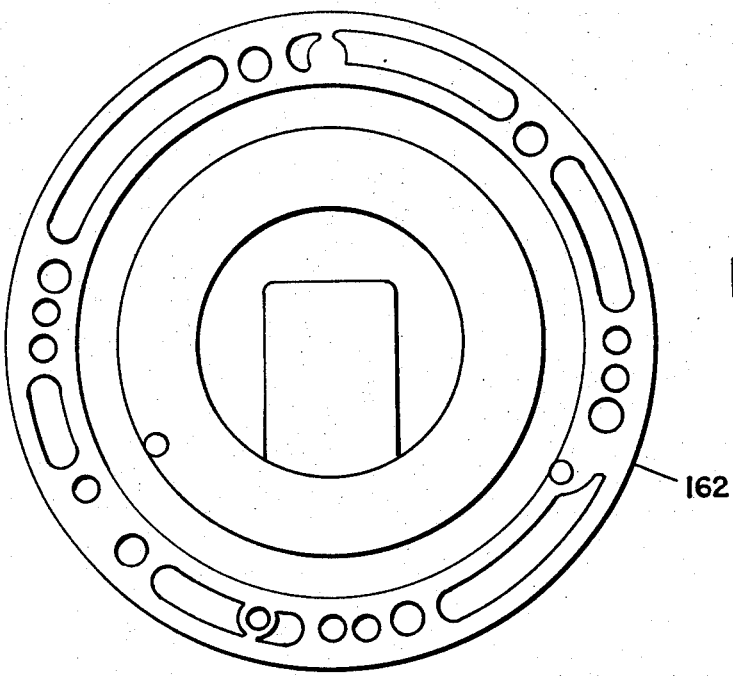
FIG_22
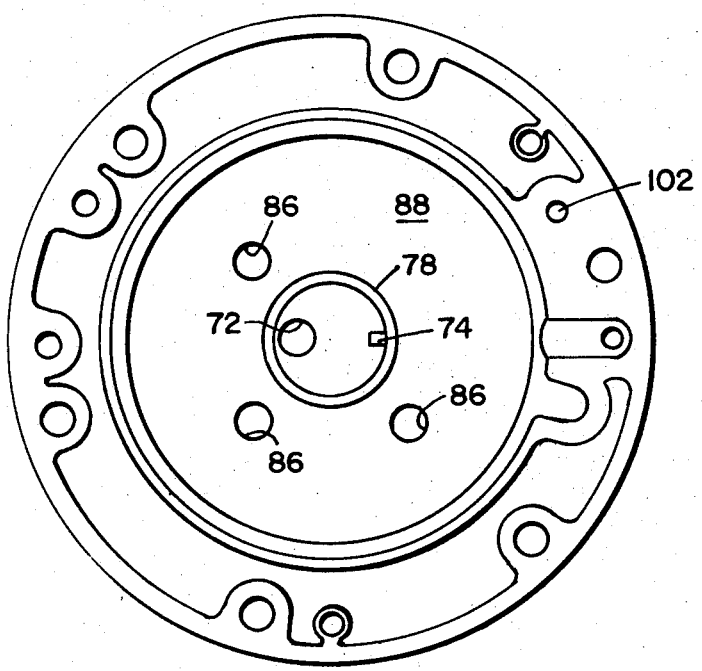
FIG_13

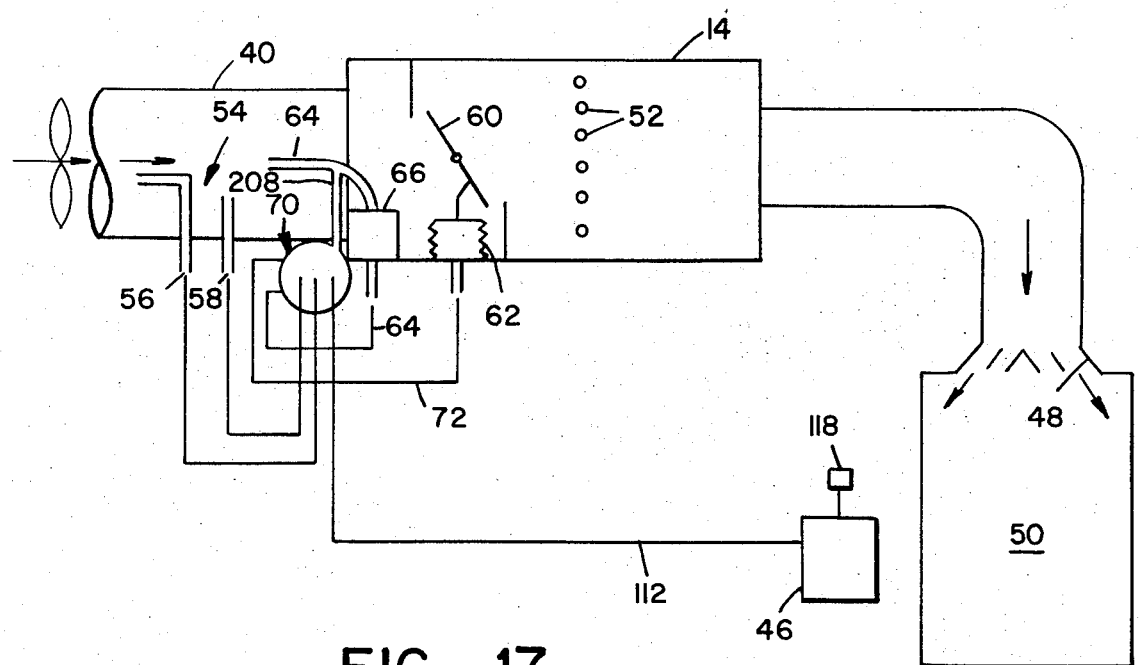
FIG_17
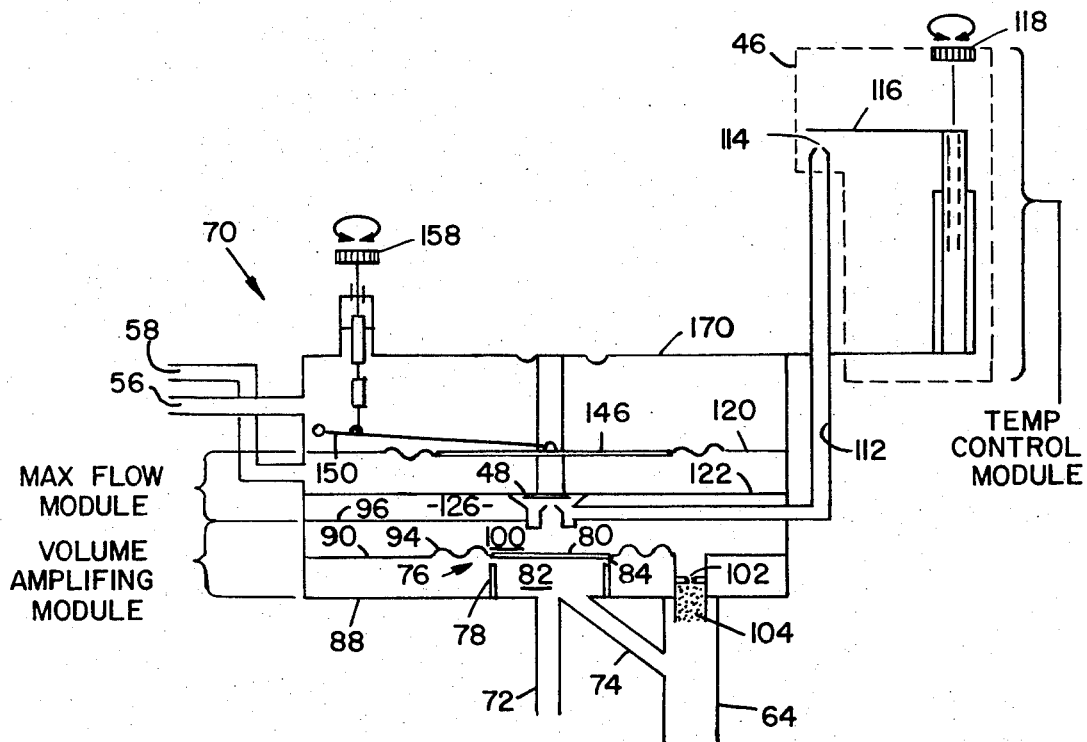
FIG_18

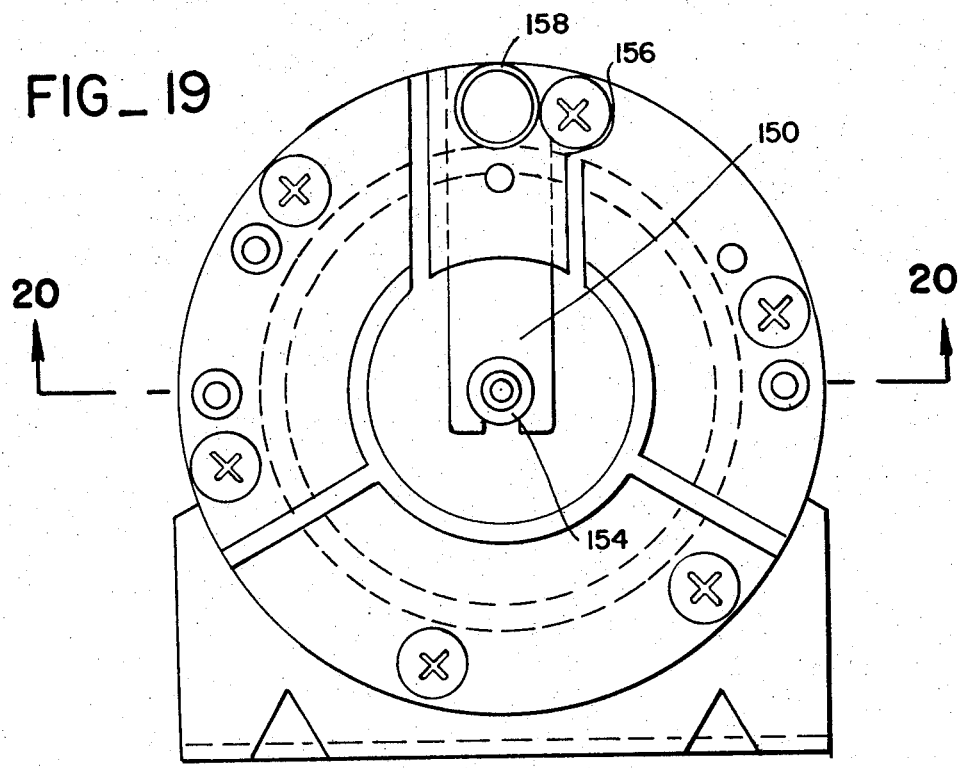
FIG_19
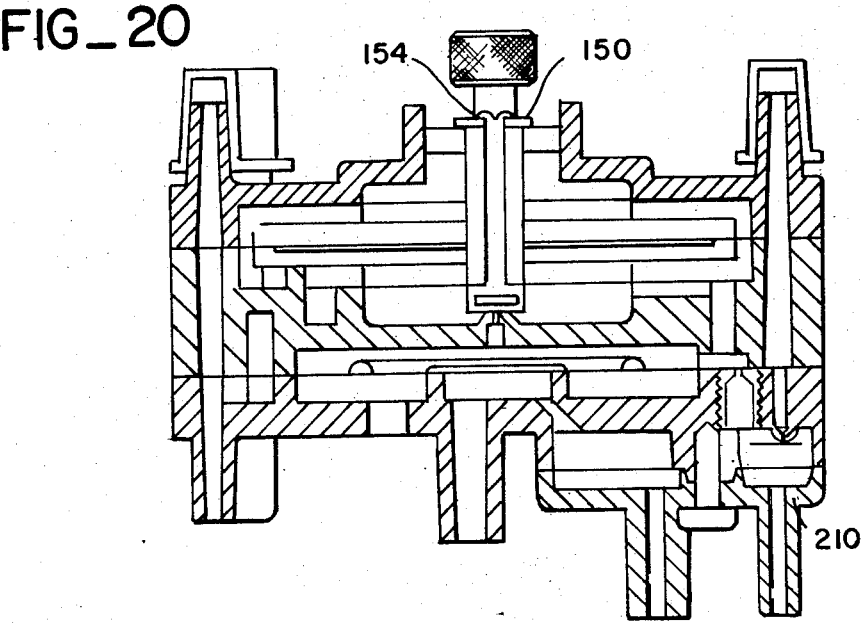
FIG_20

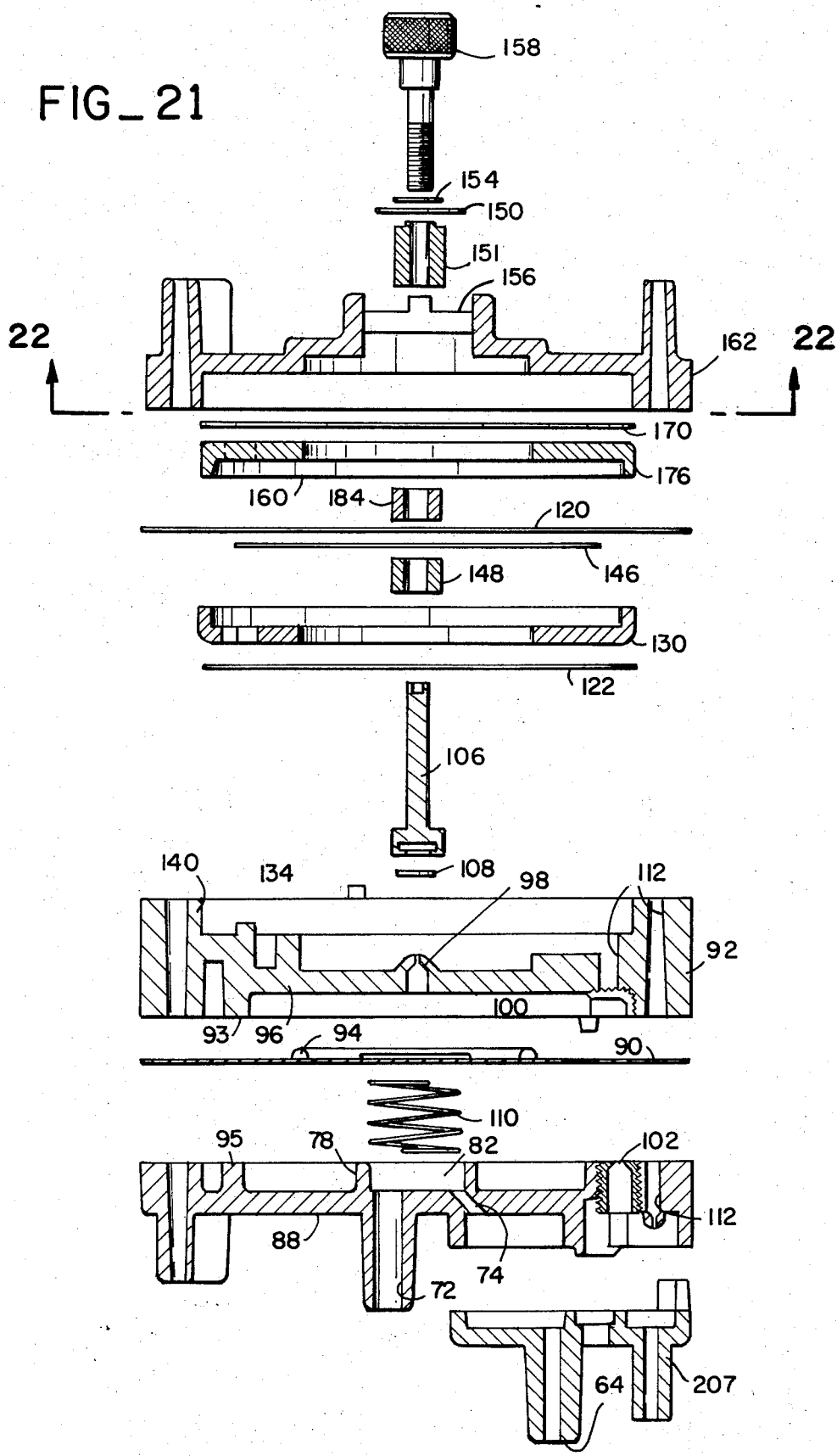

MULTI PORT FLOW CONTROLLER

BACKGROUND OF THE INVENTION

This invention relates to an air distribution system and in particular to a control unit for controlling the volume flow of conditioned air through individual volume regulator boxes and related branch ducts in the system.

Air distribution systems for large buildings have a main supply duct and a large number of branch take-off ducts connected to the supply duct for delivering conditioned air to individual rooms or zones. A volume regulator box in each branch take-off duct controls the amount of air flowing from the supply duct through the branch take-off duct to an individual room. The flow of air through the box is controlled by a valve or other means, such as a bladder expanded to restrict the flow area and contracted to enlarge the flow area through the volume control box.

In many systems the volume flow of air through the regulator box is varied in response to changes in room temperature by a thermostat. In large buildings there are many rooms or separate zones, and the overall system must be balanced to work satisfactorily. This means that an excess amount of air cannot be delivered to one room or zone at the expense of the other rooms or zones. Thus, if a room is very warm and the thermostatic control calls for the volume regulator box to go very open, this could result in giving too much air to that space. A limit function is therefore required to limit the maximum volume that can flow through a particular regulator box.

The thermostatic control by itself can cause another problem when the room temperature is quite low. In this situation the thermostatic control might try to close the volume regulator box all the way. This can result in restricting the flow below the minimum amount needed for ventilation requirements. To prevent this result a minimum flow sensing and regulating function is required.

The control arrangements developed in the prior art have a number of drawbacks. In one prior art system a balloon or bag in the duct itself is filled with a controlled amount of air to provide the desired restriction to flow through the duct. This system uses a series of orifices to sense the flow and to fill the bag. With an increased flow there is a larger pressure drop used for a control function. This system has the serious disadvantage that the thermostat cannot be remotely located. The position of the thermostat is very critical and the thermostat can be located only a limited distance away from the volume regulator box itself. Thus, the thermostat cannot be located on a wall in the room but must, as a practical matter, be made an integral part of the box and located with the box in the ceiling of the room. The control is limited to about 200 cubic feet per minute.

Another prior art system uses two diaphragms to provide a high limit relay and a low limit relay and mechanically interlocks the diaphragms to control the maximum velocity and the minimum velocity. This mechanically linked control system is very bulky and the control itself occupies a large volume. It requires a space of about 9 × 19 inches. This control is also expensive.

It is a primary object of the present invention to overcome the disadvantages and the drawbacks of the prior art controls.

A specific object of the present invention is to make secondary use of the control air. The primary control air is not bled to atmospheric. It is instead bled to a secondary control air channel having secondary bleed nozzles.

Another object of the present invention is to construct a control unit of modular construction. Each module serves a separate and independent function so that the controller can be used as a maximum volume controller in a high static pressure application or can be used as a maximum and a minimum volume controller in a low pressure application, and a volume amplifying module can be used or not used if it is desired to use the controller just as a static pressure controller.

Related objects are to construct a compact controller that can be remotely located and will perform a variety of functions with rapid response (up to 5,000 cu. ft. per minute) using quite low pressure in the range of 1 to 3 inches of water (about one twenty-seventh of a pound) so as to be operable using the duct pressure air as the control air.

Further objects of the present invention are to construct a controller which does not enlarge the space needed to install a volume regulator box, can be mounted in a position where the control unit is not subject to damage, and can be made at low cost so that it is economically feasible to use more control units with smaller zones.

An additional object of the present invention is to construct the module so that the controller can be integrated with a high pressure system, such as a 20 lb. system if desired.

SUMMARY OF THE INVENTION

The volume flow of conditioned air through a branch take-off duct in a conditioned air distribution system is regulated by a flow control valve positioned by a pneumatically powered actuator. The air for the actuator is taken from the duct at impact pressure and is conducted to the actuator through a modular controller. The controller has an actuator valve which is connected between the interior of the conduit and atmosphere so that movement of the actuator valve in opening and closing directions respectively decreases and increases the pressure and volume of air in the actuator. The impact pressure air from the branch take-off duct is also directed through an orifice in the controller to a primary control air chamber for the actuator valve. The actuator valve is positioned by the pressure in the primary air control chamber. The pressure in the primary air control chamber is regulated by bleeding air from the primary chamber through a primary bleed nozzle to a secondary control air conduit. The air is bled from the primary air control chamber in response to a first condition of system operation, and the air pressure in the secondary air control circuit is controlled by one or more secondary bleed nozzles in response to additional conditions of system operation.

The controller is constructed in modules and each module serves a separate and distinct function which may be used alone or combined with the functions of the other modules. Thus, in one form of the invention the first module is a volume amplifying module which embodies the primary air control chamber and primary bleed nozzle. The air flow through the primary bleed nozzle is controlled by a second module which serves as a constant velocity control and which also limits the maximum flow velocity. One of the secondary bleed nozzles is controlled in response to room air temperature. Another of the secondary bleed nozzles may be controlled in response to a minimum velocity setting, and a third secondary bleed nozzle may be utilized as a warm-up control.

Air distribution system apparatus and methods which incorporate the structures and techniques described above and which are effective to function as described above constitute further, specific objects of this invention.

Other objects, advantages and features of our invention will become apparent from the following detailed description of one preferred embodiment taken with the accompanying drawings.

BRIEF DESCRIPTION OF THE DRAWINGS

FIG. 1 is a schematic view of a typical air distribution system in which the flow control of the present invention is used;

FIG. 2 is a schematic view of a volume control box used with each branch take-off in the FIG. 1 system and illustrates how the various sensing and operating elements are associated in accordance with one embodiment of the present invention;

FIG. 3 is a schematic view through a cross section of a control unit constructed in accordance with one embodiment of the present invention and used with the volume control box shown in FIG. 2;

FIG. 4 is a top plan view of the control unit shown in FIG. 3;

FIG. 5 is an elevation view in cross section taken along the line and in the direction indicated by the arrows 5—5 in FIG. 4;

FIG. 6 is an elevational view taken along the line and in the direction indicated by the arrows 6—6 in FIg. 4;

FIG. 7 is a bottom plan view of the control unit shown in FIG. 3;

FIG. 8 is an exploded elevation view like FIG. 5 showing the component parts of the control unit;

FIG. 9 is a top plan view taken along the line and in the direction indicated by the arrows 9—9 in FIG. 8;

FIG. 10 is a top plan view taken along the line and in the direction indicated by the arrows 10—10 in FIG. 8;

FIG. 11 is a top plan view taken along the line and in the direction indicated by the arrows 11—11 in FIG. 8;

FIG. 12 is a top plan view taken along the line and in the direction indicated by the arrows 12—12 in FIG. 8;

FIG. 13 is a top plan view taken along the line and in the direction indicated by the arrows 13—13 in FIG. 8;

FIG. 14 is a bottom plan view taken along the line and in the direction indicated by the arrows 14—14 in FIG. 8;

FIG. 15 is a fragmentary cross-section view taken along the line and in the direction indicated by the arrows 15—15 in FIG. 4;

FIG. 16 is a fragmentary cross-sectional view taken along the line and in the direction indicated by the arrows 16—16 in FIG. 4;

FIG. 17 is a schematic view, like FIG. 2, of a volume control box having a control unit constructed in accordance with a second embodiment of the present invention;

FIG. 18 is a schematic view through a cross-section of a control unit constructed in accordance with a second embodiment of the present invention and used with the volume control box shown in FIG. 17;

FIG. 19 is a top plan view of the control unit shown in FIG. 18;

FIG. 20 is an elevational view in cross section taken along the line and in the direction indicated by the arrows 20—20 in FIG. 19;

FIG. 21 is an exploded view like FIG. 20 showing the component parts of the control unit of FIG. 20; and FIG. 22 is a bottom plan view taken along the line and in the direction indicated by the arrows 22—22 in FIG. 21.

DESCRIPTION OF THE PREFERRED EMBODIMENTS

A typical air distribution system having branch take-off ducts and a volume regulating box in each take-off duct is indicated generally by the reference numeral 30 in FIG. 1.

As illustrated in FIG. 1, a fan 32 moves return air from the building 34 through a cooling coil 36 and a duct 38 to the branch take-off ducts 40 and to other areas or zones 42.

The flow through each branch take-off duct 40 is controlled by a volume regulator box 44. Each volume regulator box 44 controls the volume flow of conditioned air through its related duct 40 in response to one or more selected conditions of operation. As will be described in greater detail below, the volume regulator box 44 may typically control as a constant velocity control, a variable volume control or a variable volume control switching to constant velocity control when the supply temperature rises.

A room thermostat 46 is usually associated with each volume regulator box 44 for sensing the room temperature and for supplying a signal to the related box 44. This regulates the volume of air flowing out of the box through the outlet duct 48 and into the room 50 in accordance with the room temperature. It should be noted also that the box 44 can be slaved to additional regulator boxes so that the additional boxes will respond to the thermostat and volume control on the master unit.

Referring now to FIG. 2, the sensing elements and the operating elements for a volume regulator box 44 are shown in more detail.

A typical box 44 contains a sound attenuator 52, a flow measuring device with an impact tube 56 and a static tube 58 (or a pitot tube having both taps), a valve or other equivalent device for varying the volume flow of air through the box 44, a pneumatically actuated bellows or bladder 62 for positioning the valve 60, an impact tube 64 for picking up actuating air at impact pressure for powering the bellows 62, and a filter 66 in the impact tube 64.

In accordance with the present invention a controller unit 70 is connected between the impact line 64 and a line 72 leading to the interior of the bellows 62. The controller 70 controls the pressure and the volume of the air within the pneumatically powered actuator bellows 62 (as will be described in greater detail with reference to FIG. 3 below) to position the valve 60 for the desired flow of conditioned air through the box 44.

The conduit lines 64 and 72 provide conduit means for supplying impact air to the interior of the bellows 62 under the control of the controller 70.

As illustrated in FIG. 3, the line 64 is connected to the line 72 by a branch line 74. The branch line 74 leads to the interior of a valve 76.

The valve 76 comprises a circular housing 78, the upper edges of which form a valve seat, and a central disc 80, the edges of which provide a movable valve element. The valve element 80 regulates the flow out of the chamber 82 through an annular opening 84 formed between the periphery of the disc 80 and the upper edge of the housing 78 when the valve element 80 is moved off of the valve seat 78 as illustrated in FIG. 3.

The air flowing out of the chamber 82 is ducted to atmosphere through openings 86 (see FIG. 13) in the bottom wall 88 of the control unit 70.

When the valve element 80 is engaged with the valve seat 78, air under impact pressure from the line 64 flows through the branch line 74 and to the bellows 62. This increases the pressure and volume of air within the bellows and causes the bellows to expand against the static pressure of air in the box 44 to move the flow control valve 60 toward a move closed position.

When the valve element 80 is moved off of the valve seat 78, air flows from the inner chamber 82 through the opening 84 and out of the opening 86 to atmosphere. This regulates the pressure of the air within the chamber 82 and therefore within the line 72 and the bellows 62. If the valve element 80 is moved far enough off of the valve seat 78, the pressure in the chamber 82 is reduced to a point at which the pressure and volume of air in the bellows 62 will be reduced and air will flow from the bellows to atmosphere through the opening 84. The static air pressure in the volume control box 44 acting on the outside of the bellows 62 will then cause the bellows 62 to contract to move the flow valve 60 toward a more open position, increasing the volume flow through the duct 40. In this condition of operation the angle at which the branch conduit 74 joins the top of the line 72, causes the impact air flowing through the branch conduit 74 to aspirate the line 72 in a venturi action to permit the bellows 62 to empty its air faster. The size of the branch conduit 74 is important. It is small in comparison to the opening 84 so that the opening 84 has the capacity to bleed out the chamber 82.

The disc 80 forms the central part of a flexible diaphragm 90. The diaphragm 90 is preferably made of molded rubber, and the outer marginal edge of the diaphragm 90 is clamped between the bottom ring 88 and a second ring 92.

As best illustrated in FIG. 8 the ring 92 has a sealing ridge 93, and the ring 88 has a sealing ridge 95 for engaging the margin of the flexible diaphragm 90 in sealing relationship when these two rings are assembled together. The rings 88 and 92 are molded from a plastic material and are circular in plan (as illustrated in FIGS. 12, 13 and 14) to simplify machining.

The diaphragm 90 has one or more corrugations 94 to permit the desired amount of vertical movement of the central disc portion 80 of the diaphragm.

The second ring 92 has an upper wall 96 formed with a bleed nozzle 98. The upper wall 96 and the upper surface of the diaphragm 90 provide an enclosed primary air control chamber 100.

Air from the impact line 64 is conducted into the primary air control chamber 100 through an orifice 102. A filter 104 is positioned upstream of the orifice 102. The orifice 102 is of relatively small diameter as compared to the diameter of the bleed nozzle 98. The air from the orifice 102 is conducted to the chamber 100 by the passageway 101 formed in the lower surface of the ring 92. See FIG. 14.

An arbor 106 has a circular disc 108 at its lower end which controls the flow of air through the bleed nozzle 98. Thus, when the disc 108 is moved upward off of the nozzle 98, the relatively large internal diameter of the nozzle 98 permits air to bleed more rapidly from the primary air control chamber 100 than the air can be supplied through the restricted orifice 102 and the pressure in the primary air control chamber 100 drops. The higher pressure in the chamber 82 and the normal shape of diaphragm 90 acts on the under side of the central disc 80 to move this disc upward and off of the valve seat 78 to reduce the pressure and volume of the air in the bellows 62, which in turn moves the flow valve 60 toward a more open position.

When the disc 108 is engaged with the bleed nozzle 98 the impact air flowing through the orifice 102 increases the pressure in the primary air control chamber to cause the valve element 80 to seat on the valve seat 78. This happens because the surface of the diaphragm 90 that is exposed to the impact pressure in the primary air control chamber 100 is larger than the surface that is exposed to the impact air pressure in the chamber 82. When the valve element 80 seats on the valve seat 78, the pressure and volume of the air in the bellows 62 therefore builds up to move the flow control 60 toward a more closed position.

The two rings 92 and 88 and the flexible diaphragm 90 thus serve as a volume amplifying module (see the legend in FIG. 3) in which a small volume of air in the primary air control chamber 100 is effective to control a large volume of air in the bellows 62.

As illustrated in FIG. 8 a light biasing spring 110 is preferably positioned against the lower surface of the valve element 80 and seated in the interior of the valve housing 78.

In actual practice the disc 108 usually does not fully close the bleed nozzle 98. Instead the control disc 108 is normally positioned slightly off of the end of the bleed nozzle 98 to partially restrict flow through the nozzle. This controls the pressure within the primary air control chamber 100 without hunting.

In accordance with the present invention the air flowing through the bleed nozzle 98 flows into a secondary air control conduit 112. A plurality of bleed nozzles 114, 164 and 204 bleed air from this secondary air conduit in response to certain conditions of system operation.

One such condition is the air temperature in the room 50, and a temperature control module (indicated by the legand Temperature Control Module in FIG. 3) associated with the bleed nozzle 114.

The bleed nozzle 114 in the temperature control module permits a controlled amount of air to bleed from the secondary air conduit 12 in response to the position of a bimetal lid 116. The bimetal 116 is temperature sensitive and is positioned by a temperature set point adjustment knob 118.

When the temperature of the air from the room 50 is hotter than the setting which is set on the temperature set point adjustment knob 118, the temperature sensitive bimetal lid 116 will be bent up away from the temperature control bleed nozzle 114, and the secondary air conduit 112 will be vented to atmosphere.

As will be described in greater detail below, bleeding air from the nozzle 114 tends to reduce the pressure in the primary air control chamber 100 to open the flow control valve 60. However, and as will also be described in greater detail below, this increase in the flow through the volume regulator box 44 is subject to a maximum limitation as determined by a spring setting of a maximum flow module of the controller unit 70.

As the temperature of the air in the room 50 cools down, the temperature sensitive bimetal lid 116 bends down near the temperature nozzle 114. The flow of secondary control air through the bleed nozzle 114 is reduced. This causes a buildup of secondary air control pressure in the secondary air conduit 112 and thus in the primary air control chamber 100. This pressure build-up causes the flow control valve 60 to move toward a more closed position.

When the temperature sensitive bimetal lid 116 bends far enough, it seals off the flow of air through the bleed nozzle 114. Without a vent to atmosphere, the secondary control air pressure in the secondary air conduit 112 would continue to build up until there would be no flow through the volume regulator box 44. This is prevented in the construction shown in FIG. 3 by a minimum flow module which will be described in greater detail below.

The temperature control module therefore determines at what temperature the room 50 or other area will be maintained, subject (in the FIG. 3 form of the present invention) to the action of a maximum flow module and the action of a minimum flow module control.

The temperature control module may be set on top of the other modules or it may be remotely located.

As noted above, the controller unit 70 includes a maximum flow module. The component parts of this module are indicated in FIG. 3 by the legend Maximum Flow Module.

The FIG. 3 embodiment also indicates a module which regulates the minimum flow through the volume regulator box 44, and the component parts of this module are indicated by the legend Minimum Flow Module in FIG. 3.

The volume flow through the volume regulator box 44 is determined by the difference between the impact and static pressures as sensed by the lines 56 and 58. This pressure difference is developed across a maximum velocity flow sensing diaphragm 120 and is applied through the arbor 106 and through a maximum flow velocity isolation seal diaphragm 122 to position the control disc 108 with respect to the beled nozzle 98.

The isolation diaphragm 122 isolates the static pressure in a chamber 124 (between the maximum flow diaphragm 120 and the isolation seal diaphragm 122) from atmospheric pressure in a chamber 126 below the isolation seal diaphragm 122. As will be described in greater detail below, this diaphragm may be arranged to work in opposition to a similar isolation seal diaphragm 170 in the minimum flow module. It should be noted that the only time the pressure drop across an isolation diaphragm is of concern is when the secondary control pressure in the conduit 112 is at atmospheric pressure. This is true when the secondary control pressure is greater than atmospheric and the bleed nozzle 98 is open. In these circumstances the controller 70 is controlling on some secondary condition such as the room thermostat, the maximum velocity or the minimum velocity.

As best illustrated in FIG. 8, an inner sealing ring 130 has a lower surface 132 which engages the margin of the isolation seal diaphragm 122 and presses that margin in sealing relation against a related upper surface 134 of the ring 92. The sealing ring 130 has a central opening 136, and it is the area of this opening on which the difference between the static pressure in the chamber 124 and the atmospheric pressure in the chamber 126 acts on the isolation diaphragm 122. The sealing ring 130 has an upturned outer edge 138 which fits within a counter bore 140 in the ring 92. The upper surface of the upturned edge 138 engages the maximum flow diaphragm 120 and presses that part of the diaphragm in sealing engagement with a lower surface 142 of a ring 144. The edge 138 has an opening 135 extending through the edge for the passing of static pressure air from the conduit 58 into the interior of the ring, and an alignment key 137 engages a related keyway in the counter bore 140 to maintain alignment of the opening 135 with the conduit 58 (see FIG. 12).

The arbor 106 passes through and is sealingly attached to the center of the isolation seal diaphragm 122. The arbor 106 also passes through a central opening in a disc stiffener 146. The disc stiffener 146 engages the under surface of the maximum velocity diaphragm 120. A spacer 148 seats on a shoulder 150 at the lower end of the arbor 106 and engages the underside of the disc stiffener 146 to hold the disc stiffener 146 against the maximum flow diaphragm 120.

With continued reference to FIG. 8 a first leaf spring 150 is attached to the top of the arbor 106 between a nut 152 and a retaining ring 154. The leaf spring pivots on a fulcrum 156 projecting into the interior of the ring from the top side of the ring 144. An adjusting screw 158 is threaded within the control unit 70 and presses down on the outer end of the leaf spring 150 to set the level of the maximum flow volume through the volume regulator box 44.

The fragmentary detailed view of FIG. 15 illustrates the assembled relationship of these spring components described immediately above.

In the operation of the maximum flow module, the impact air flowing into the chamber 160 above the maximum flow diaphragm 120 tends to move the arbor 106 and the control disc 108 downward, against the lower static pressure in the chamber 124 beneath the max flow diaphragm 120, to close the bleed nozzle 98. This downward closing movement of the max flow diaphragm 120 is resisted by the bias of the leaf spring 150 which tends to pull up, as viewed in FIG. 3 and in FIG. 15, on the arbor 106 and the control disc 108. Thus, when the volume flow through the volume regulator box 44 is below the maximum level as set by the adjustment knob 158 and control spring 150, the control disc 108 will be sufficiently far away from the bleed nozzle 98 that the pressure in the secondary air control conduit 112 is above atmospheric and can be vented to atmosphere in a controlled manner, as by the temperature control module nozzle 114 as described above, to provide a means of reducing the secondary air control pressure in the conduit 112 to move the flow control valve 60 toward a more open position and to permit a greater volume flow through the duct 40. However, when the flow volume reaches a maximum level as determined by the bias of the spring 150, the impact pressure in the chamber 160 becomes sufficiently greater than the static pressure in the chamber 124 to flex the maximum flow diaphragm 120 downward against the bias of the spring 150 and to restrict flow bleed air out of the nozzle 98. This then increases the pressure in the primary air control chamber 100 and moves the flow control valve 60 toward a more closed position.

The minimum flow control module contains basically the same parts as described above with respect to the maximum flow module but reversed in arrangement and function to limit the extent to which the flow control valve 60 can be closed and to thereby provide for a minimum flow through the volume control box 44.

The minimum flow module thus comprises a top ring 62 having a bleed nozzle 164 for bleeding air from the secondary air conduit 112 to atmosphere.

An upper arbor 166 having a control disc 168 controls the flow of bleed air through the nozzle 164.

An isolation seal diaphragm 170 is sealingly connected to the arbor 166 and is pressed into sealing engagement around its outer periphery with an inner surface 172 of the top ring 162 by the upper surface 174 of a sealing ring 176 having a downwardly projecting sealing rim 178. The sealing rings 130 and 176 are identical and can be used interchangeably. The use of these two rings eliminates the need for two more modules with holes and other details and thus reduces the overall height of the control unit 70.

A disc stiffener 180 is engaged with a minimum flow velocity sensing diaphragm 182 by a spacer 184.

The minimum flow diaphragm 182 separates the static chamber 186 from the impact chamber 160.

The downwardly projecting rim 178 of the sealing ring 176 engages the minimum flow diaphragm 182 in sealing engagement with a surface 188 on the upper side of the ring 144.

The sealing ring 176 has a central opening 177 and the difference between the static pressure in the chamber 186 and the atmospheric pressure in the chamber 190 operates on the diaphragm 170 across the area of this opening 177.

The ring 144 has inwardly projecting fulcrum 192 on the lower surface of the ring. This is the fulcrum for a minimum flow velocity leaf spring 194 which is connected to the lower end of the arbor 166 by a nut 196 and a retaining ring 198. See also the detailed showing in FIG. 16. The outer end of the leaf spring 194 is hooked onto a groove 200 in the lower end of an adjustment screw 202 so that upward movement of the screw 202 pulls downward on the diaphragm 182 with greater force. Note that the spring 194 is schematically shown as a coil spring in FIG. 3.

In the operation of the minimum flow module the minimum flow diaphragm 182 responds to the rate of velocity flow through the volume regulator box 44 in the same manner as the maximum flow diaphragm 120 responds except that the minimum flow diaphragm 182 moves downwardly, as viewed in FIG. 3, with decreasing flow. The spring 194 determines the flow velocity to move the minimum flow diaphragm 182 upward to seal the bleed nozzle 164. When the temperature control module moves downward against the bleed nozzle 114 to seal off the bleed nozzle 114 on decreasing temperature in the room, thus building up pressure in the secondary air conduit 112 and moving the flow control valve 60 toward a more closed position, the decrease in velocity flow through the volume regulator box 44 is sensed across the minimum flow diaphragm 182. When the velocity flow is reduced to the setting of the spring 194, the control disc 169 will be moved sufficiently far off of the bleed nozzle 164 to bleed air from the secondary air control conduit 112 to maintain a minimum flow velocity through the volume regulator box 44 in accordance with the setting of the spring 194.

The rings 88, 92, 144 and 162 are connected together by a plurality of bolts 191 and nuts 193 to provide an axially compact control unit 70 to provide an assembled control unit 70 which is quite compact axially as best illustrated in FIG. 5.

In accordance with the present invention the control unit 70 may also include a warm-up control for supplying a maximum of warm air through the volume control box 44 (subject to the control of the maximum velocity control module) in the morning when the building is cold and the supply air temperature in the main duct 38 (see FIG. 1) is raised from a normal temperature, such as 50 degrees, to a higher temperature, such as 80 degrees, to pick the building temperature up fast. This warm-up control includes a bleed nozzle 204 connected to the secondary air conduit 112, a bimetal strip 206 and a conduit 208 connected to the duct 40 and opening on the bimetal strip 206. The conduit 208 is connected to a port 207 in a housing 210 (see FIG. 7). The port 207 therefore conducts air directly from the upstream side of the flow valve 60 in the duct to the chamber having the bimetal strip 206. This direct ducting of the air to the bimetal strip eliminates problems because of loss of heat by radiation and conduction if the air were to be transmitted through the conduit 64 and filter 66 to the bimetal strip. The warm air flowing through the conduit 208 causes the bimetal strip 206 to warp away from the bleed port 208 to bleed air out of the secondary air conduit 112. This causes the bellows 62 to move the flow control valve 60 toward a more open position until the flow through the volume regulator box 44 increases to the maximum velocity as set by the maximum flow module and provides immediate warm-up at a maximum rate.

The present invention has the advantage of locating the warm-up control on the controller module itself rather than in the usual location up in the duct.

Another feature of this warm-up control is that the setting on the bimetal strip 206 can be easily adjusted. This involves using an Allen-head wrench in a socket 209 putting an Allen-head wrench through a channel 209 (see FIG. 4) to engage a screw in the bottom of the socket (not shown in the drawings) to change the bias exerted by the bimetal strip 206.

FIG. 4 illustrates another advantage of the present invention. All of the adjustments are on the top face of the controller unit. Thus, the maximum velocity adjustment 158, the minimum velocity adjustment 202, and the warm-up adjustment are all located on the top face of the controller as shown in FIG. 4.

The description and discussion above relates to a volume regulator box having a pitot tube impact and static differential pressure sensor located on the downstream side of the flow control valve 60.

Some users prefer to locate the pitot tube on the upstream side of the flow control valve 60 because this gives a more representative sample in certain configurations of the box 44. For example, some configurations of the box 44 produce a substantial amount of turbulence in the box, and in those cases it is desirable to locate the pitot tube upstream of the flow control valve 60. FIGS. 17–22 relate to a control unit 70 constructed to operate with this location of the pitot tube.

When the pitot tube sensor is placed on the upstream side, the static pressure does not indicate the flow as it does on the downstream side. It is therefore preferable to omit the minimum flow module in this form of the flow controller unit 70. The flow controller unit 70 illustrated in FIGS. 17–21 thus incorporates the same basic parts as the control unit 70 illustrated in FIGS. 1–16, except for the minimum velocity sensing diaphragm 182 (and related structure), and the parts in the FIGS. 17–22 form which correspond to the parts in the FIGS. 2–16 form are indicated by the same reference numerals.

The detailed description of the parts and the operation of those parts in FIGS. 17–22 will therefore not be repeated.

It should be noted that in the FIG. 21 form the static pressure is in the impact pressure in the chamber 160 beneath the isolation seal diaphragm 170 so that this diaphragm 170 acts in conjunction with the lower isolation seal diaphragm 122 to produce a balanced effect on the maximum flow diaphragm 120.

The inner end of the leaf spring 150 in the FIGS. 17-22 form engages the underside of the retainer 154 to pull up on the arbor 106 and maximum flow diaphragm 120. The fulcrum 162 for the spring is formed on the top ring 162, and a spacer 151 fits on the arbor 106 beneath the inner end of the leaf spring 150.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method of controlling the volume flow of conditioned air through a duct in an air distribution system, said method comprising,
   regulating the volume of air flowing through the duct by a pneumatically powered actuator,
   taking air from the duct at impact pressure and conducting said impact pressure air through a first conduit to the actuator,
   connecting an actuator valve between the interior of the first conduit and atmosphere so that movement of the actuator valve in opening and closing directions respectively decreases and increases the pressure and volume of air in the actuator,
   also directing said impact pressure air from the duct through an orifice to a primary control air chamber,
   positioning the actuator valve by the pressure in the primary control air chamber,
   and bleeding primary control air in the chamber to a secondary control air conduit in response to a first condition of system operation.

2. The invention defined in claim 1 wherein the actuator positions a flow control valve in the duct.

3. The invention defined in claim 1 wherein the actuator is a bladder which expands and contracts to vary the flow area across the duct.

4. The invention defined in claim 1 wherein the first condition of system operation is the difference between the impact pressure and the static pressure of the air flowing in the duct.

5. The invention defined in claim 4 wherein the impact pressure and the static pressure is that existing upstream of the actuator.

6. The invention defined in claim 4 wherein the impact pressure and the static pressure is that existing downstream of the actuator.

7. The invention defined in claim 4 including amplifying the control method by using a small amount of air in the primary air control chamber to control a large amount of air in the actuator.

8. The invention defined in claim 7 including using a differential area diaphragm having a large area on one side exposed to the pressure in the primary air control chamber and a small area on the other side exposed to the pressure in said first conduit.

9. The invention defined in claim 7 including isolating the effect of atmospheric pressure from the difference between the impact pressure and the static pressure.

10. The invention defined in claim 9 including using two counter-balancing diaphragms each exposed to atmospheric pressure on one side and static duct pressure on the other side.

11. The invention defined in claim 1 including bleeding air from the secondary control air conduit in response to a second condition of system operation.

12. The invention defined in claim 11 wherein the second condition is room air temperature.

13. The invention defined in claim 11 wherein the second condition is a minimum velocity flow condition in the duct.

14. The invention defined in claim 11 wherein the second condition is a maximum velocity flow condition in the duct.

15. The invention defined in claim 11 wherein the second condition of system operation is the temperature of air in the duct upstream of the actuator.

16. The invention defined in claim 13 including an adjustable spring for varying the minimum velocity flow condition.

17. The invention defined in claim 14 including an adjustable spring for varying the maximum velocity flow condition.

18. The invention defined in claim 11 wherein the second condition includes room temperature and maximum velocity flow in the duct.

19. The invention defined in claim 18 wherein the second condition includes a minimum velocity flow in the duct.

20. A control for a conditioned air distribution system of the kind having an air flow duct, a movable member in the duct for regulating the volume of air flowing through the duct and a pneumatically powered actuator connected to position the movable member, said control comprising,
   first conduit means extending between the interior of the duct and the actuator for supplying air from the duct at impact pressure to the actuator,
   actuator valve means connected between the interior of the duct and atmosphere so that movement of the valve means varies the pressure and volume of air in the actuator, primary air control means connected to position the actuator valve means in response to pressure in the primary air control means, first bleed means for bleeding pressure from the primary air control means in response to a first condition of system operation, and secondary air control means connected to the primary air control means through said first bleed means.

21. The invention defined in claim 20 wherein said primary air control means comprise a primary chamber having a movable wall for transmitting motion to the actuator valve means in response to changes in pressure in the primary chamber and including second conduit means having an orifice therein for supplying air from the duct at impact pressure to the inlet side of the orifice for flow through the orifice to the interior of the primary chamber.

22. The invention defined in claim 21 wherein the movable wall is a differential area diaphragm having a large area on one side exposed to the pressure in the primary chamber and a small area on the other side exposed to the pressure in said first conduit whereby the control is a volume amplifying control in which a small amount of air in the primary chamber controls a large amount of air in the actuator.

23. The invention defined in claim 21 wherein the first condition of system operation is the difference between impact pressure and static pressure of the air flowing in the duct and including impact-static pressure differential means for regulating the bleed flow through said first bleed means.

24. The invention defined in claim 23 wherein secondary air control means include secondary bleed means for bleeding air from the secondary air control means in response to a second condition of system operation.

25. The invention defined in claim 24 wherein the second condition is room air temperature.

26. The invention defined in claim 24 wherein the second condition is a maximum flow velocity condition in the duct.

27. The invention defined in claim 24 wherein the second condition is a minimum flow velocity condition in the duct.

28. The invention defined in claim 24 wherein the second condition is the temperature of air in the duct upstream of the actuator.

29. The invention defined in claim 24 wherein the second condition includes room temperature and maximum velocity flow in the duct.

30. The invention defined in claim 29 wherein the second condition includes a minimum flow velocity condition in the duct.

31. A modular controller unit for a conditioned air distribution system of the kind having a duct, a flow control valve in the duct and a pneumatic actuator for positioning the flow control valve in response to air supplied to and withdrawn from the actuator by the controller unit, said controller unit comprising, a first module having actuator air conduit means for supplying impact air from the duct to the module and for conducting air between the module and the actuator, an actuator valve means in said conduit means for controlling the volume and pressure of air in the actuator by bleeding air from the conduit means to atmosphere on opening of the actuator valve means, a primary air control chamber, an inlet conduit with an orifice therein for supplying impact air from the duct to the primary air control chamber, movable wall means in the primary air control chamber for positioning the actuator valve means in response to changes in pressure in the primary air control chamber, and first bleed means for bleeding a controlled amount of air from the primary air control chamber, said modular control unit also including a secondary air control conduit means connected to said first bleed means and first bleed control means for regulating the flow through said first bleed means in response to a first condition of system operation.

32. The invention defined in claim 31 wherein said first movable is a volume amplifying module and said movable wall means have one surface of large area exposed to the pressure in the primary air control chamber and an opposite surface of small area exposed to the pressures in said conduit means whereby a small amount of air in the primary air control chamber controls a large amount of air in the actuator.

33. The invention defined in claim 32 wherein the first condition of system operation is the difference between the impact pressure and the static pressure of the air flowing in the duct.

34. The invention defined in claim 31 including a maximum flow module associated with said first module, said maximum flow module having a static chamber for receiving static air pressure from the duct, an impact chamber for receiving impact pressure from the duct, and a flexible diaphragm dividing the static and impact chambers and connected to the regulator means for said first bleed means.

35. The invention defined in claim 34 including a temperature control module, said temperature control module having a temperature bleed nozzle for bleeding air from the secondary air control circuit means in response to room temperature.

36. The invention defined in claim 35 including a minimum flow module associated with the first module and the maximum flow module, said minimum flow module having an impact chamber for receiving the pressure of the impact air in the duct, a static chamber for receiving the static pressure of the air in the duct and a flexible diaphragm separating the impact chamber and the static chamber and wherein the impact chamber of the minimum flow module is the same chamber as the impact chamber of the maximum flow module.

37. The invention defined in claim 36 including first adjustable biasing means connected to the diaphragm of the maximum flow module for varying the maximum duct air flow permitted by the modular control unit and second adjustable biasing means connected to the diaphragm of the minimum flow module for varying the minimum duct air flow permitted by the modular control unit.

38. The invention defined in claim 36 wherein the first module, maximum flow module and minimum flow module are circular in plan and axially aligned.

39. The invention defined in claim 36 wherein the maximum flow module includes an isolation seal diaphragm forming one wall of the static chamber and exposed to atmospheric pressure on the side opposite that exposed to the static pressure.

40. The invention defined in claim 36 wherein the minimum flow module includes an isolation seal diaphragm forming one wall of the static chamber and exposed to atmospheric pressure on the surface opposite that exposed to the static pressure.

41. The invention defined in claim 40 wherein the isolation seal diaphragm of the maximum flow module and the isolation seal diaphragm of the minimum flow module are arranged to counterbalance each other in their effect on the positioning of the first bleed means.

42. The invention defined in claim 41 including an axially flanged circular disc having a central opening engaged with the isolation seal diaphragm in the max flow module.

43. The invention defined in claim 42 including an axially flanged circular disc having a central opening and engaged with the isolation seal diaphragm in the minimum flow module.

* * * * *

UNITED STATES PATENT OFFICE
CERTIFICATE OF CORRECTION

Patent No. 3,806,027  Dated April 23, 1974

Inventor(s) LEROY DRY GINN and LEROYCE SLOE GINN

It is certified that error appears in the above-identified patent and that said Letters Patent are hereby corrected as shown below:

Figure 3 should appear as shown below.

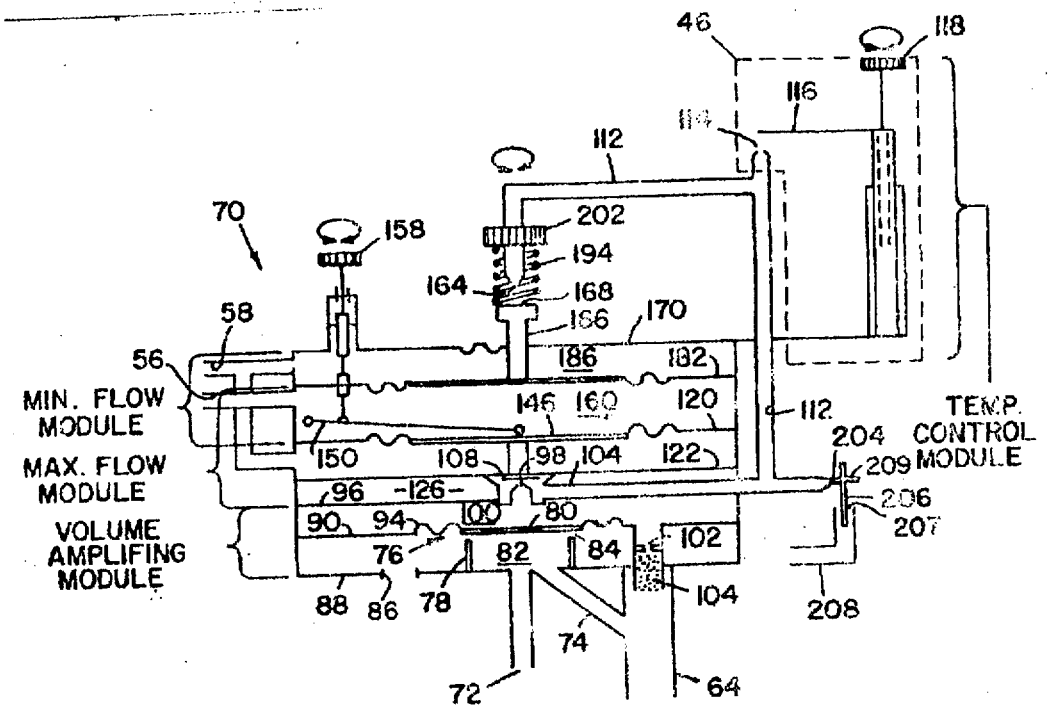

FIG_3

UNITED STATES PATENT OFFICE
CERTIFICATE OF CORRECTION

Patent No. 3,806,027          Dated April 23, 1974

Inventor(s) LEROY DRY GIRE and LEROYCE SLOE GIRE

It is certified that error appears in the above-identified patent and that said Letters Patent are hereby corrected as shown below:

Column 2, line 59 "control circuit" should read -- control conduit--. Column 5, line 28, "move" should read --more--. Column 7, line 58, "holed" should read --bleed--. Column 8, line 24, "passing" should read --passage--. Column 10, line 9, "169" should read --169--. Column 4, line 62 after the (.) add the following sentence, -- Although Fig. 1 shows flow velocity measurement by a pitot tube for purposes of illustration, the controller of the present invention can equally well be used where the flow velocity is measured by other means (e.g. pressure taps on opposite sides of an orifice). --

In the Claims

Claim 32, Column 14, line 17, "first moveable" should read --first module--. Claim 35, Column 14, line 39, "control circuit" should read --control conduit--.

Signed and Sealed this thirteenth Day of January 1976

[SEAL]

Attest:

RUTH C. MASON
Attesting Officer

C. MARSHALL DANN
Commissioner of Patents and Trademarks